United States Patent
Shah et al.

(10) Patent No.: US 11,593,112 B2
(45) Date of Patent: Feb. 28, 2023

(54) AUTOMATED RUNTIME CONFIGURATION FOR DATAFLOWS

(71) Applicant: Microsoft Technology Licensing, LLC, Redmond, WA (US)

(72) Inventors: Abhishek Uday Kumar Shah, Seattle, WA (US); Anudeep Sharma, Bothell, WA (US); Mark A. Kromer, Snohomish, WA (US); Jikai Ma, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 427 days.

(21) Appl. No.: 16/811,448

(22) Filed: Mar. 6, 2020

(65) Prior Publication Data

US 2021/0279062 A1 Sep. 9, 2021

(51) Int. Cl.
*G06F 16/25* (2019.01)
*G06F 9/50* (2006.01)
(Continued)

(52) U.S. Cl.
CPC .......... *G06F 9/328* (2013.01); *G06F 9/30036* (2013.01); *G06F 11/3006* (2013.01);
(Continued)

(58) Field of Classification Search
CPC .... G06F 9/328; G06F 9/30036; G06F 9/5072; G06F 9/5044; G06F 9/5066;
(Continued)

(56) References Cited

U.S. PATENT DOCUMENTS 10,728,120 B2 * 7/2020 Beyer ................... H04L 43/045
11,269,911 B1 * 3/2022 Jones ..................... G06F 9/543
(Continued)

OTHER PUBLICATIONS

Yung-Chuan Jiang et al., Temporal Partitioning Data Flow Graphs for Dynamically Reconfigurable Computing, 2007 IEEE, [Retrieved on Jun. 9, 2022]. Retrieved from the internet: <URL: https://ieeexplore.ieee.org/stamp/stamp.jsp?tp=&arnumber=4378270> 11 Pages (1351-1361) (Year: 2007).*

(Continued)

*Primary Examiner* — Anibal Rivera
(74) *Attorney, Agent, or Firm* — Fiala & Weaver P.L.L.C.

(57) ABSTRACT

Methods, systems and computer program products are provided for automated runtime configuration for dataflows to automatically select or adapt a runtime environment or resources to a dataflow plan prior to execution. Metadata generated for dataflows indicates dataflow information, such as numbers and types of sources, sinks and operations, and the amount of data being consumed, processed and written. Weighted dataflow plans are created from unweighted dataflow plans based on metadata. Weights that indicate operation complexity or resource consumption are generated for data operations. A runtime environment or resources to execute a dataflow plan is/are selected based on the weighted dataflow and/or a maximum flow. Preferences may be provided to influence weighting and runtime selections.

20 Claims, 4 Drawing Sheets

(51) Int. Cl.
 *G06F 9/32* (2018.01)
 *G06F 16/16* (2019.01)
 *G06N 20/20* (2019.01)
 *G06F 9/30* (2018.01)
 *G06F 11/30* (2006.01)
 *G06N 3/08* (2023.01)
 *G06N 3/04* (2023.01)

(52) U.S. Cl.
 CPC ........... *G06F 16/164* (2019.01); *G06N 20/20* (2019.01); *G06F 9/5072* (2013.01); *G06N 3/0445* (2013.01); *G06N 3/0454* (2013.01); *G06N 3/08* (2013.01)

(58) Field of Classification Search
 CPC .... G06F 11/3006; G06N 20/20; G06N 20/00; G06N 3/08; G06N 3/0445; G06N 3/082; G06N 3/0454
 See application file for complete search history.

(56) References Cited

U.S. PATENT DOCUMENTS

| | | | | |
|---|---|---|---|---|
| 2016/0189034 | A1* | 6/2016 | Shakeri | G09B 5/00 706/47 |
| 2018/0232702 | A1* | 8/2018 | Dialani | G06Q 10/1053 |
| 2019/0147076 | A1* | 5/2019 | Yang | G06N 20/00 707/741 |
| 2020/0042362 | A1* | 2/2020 | Cui | G06K 9/6274 |

OTHER PUBLICATIONS

Daniel Casini et al., Memory Feasibility Analysis of Parallel Tasks Running on Scratchpad-Based Architectures, 2018 IEEE, [Retrieved on Sep. 21, 2022]. Retrieved from the internet: <URL: https://ieeexplore.ieee.org/stamp/stamp.jsp?tp=&arnumber=8603223> 13 Pages (312-324) (Year: 2018).*

Lee, et al., "Adaptive Workflow Scheduling Strategy in Service-Based", In Proceedings of the International Conference on Grid and Pervasive Computing, May 2, 2007, pp. 298-309.

"International Search Report and Written Opinion Issued in PCT Application No. PCT/US2021/015982", dated May 11, 2021, 10 Pages.

* cited by examiner

AUTOMATED RUNTIME CONFIGURATION FOR DATAFLOWS

BACKGROUND

Data analytics involves processing raw data (e.g., to make it "business ready") and/or analyzing data (e.g., to generate reports or to make decisions) using data workflows. For example, a computer user (e.g., data engineer) may design a dataflow to access or extract data from one or more sources, transform the data and load the transformed data into one or more sinks. Different types of dataflows exist, including an extract, transform and load (ETL) process, an extract, load and transform (ELT) process, etc. Users may resort to guessing when it comes to selecting computing resources (e.g., processors, memory, storage, network resources) to execute a data workflow. Such guessing may lead to too many or too few resources being allocated, which may result in disruptions, failures (e.g., resource allocation failure, out of memory), delays, and/or excessive costs to execute workflows.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are provided for automated runtime configuration for dataflows, such as to automatically select or adapt a runtime environment or resources to a dataflow plan prior to execution. Metadata generated for dataflows indicates dataflow information, such as numbers and types of sources, sinks and operations, and the amount of data being consumed, processed and written. Weighted dataflow plans are created from unweighted (e.g., codeless graphical) dataflow plans based on metadata. Weights that indicate operation complexity or resource consumption are generated (e.g., by a trained model) for data operations (e.g., features). A runtime environment and/or one or more resources to execute a dataflow plan is/are selected based on the weighted dataflow and/or a determined maximum flow. Preferences may be provided to influence weighting and runtime selections.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

A dataflow (e.g., an ETL or ELT process) may access or extract data from one or more sources, transform the data, and load the transformed data into one or more sinks. Automated runtime configuration for dataflows are desired to avoid guessing/trial and error with respect to the selection of computing resources (e.g., processors, memory, storage, network resources) (also referred to as "runtime resources") to execute a data workflow. Such an automated runtime configuration for dataflows is desired to yield the correct number of resources, avoid disruptions, failures (e.g., resource allocation failure, out of memory), delays, and/or excessive costs to execute a workflow.

According to embodiments, an automated runtime configuration system for dataflows may intelligently select one or more (e.g., the most) suitable runtime for a given dataflow, such as by using Machine Learning (ML) and artificial intelligence (AI) models with dataflow telemetry, which permits data engineers to focus on data transformation logic without worrying about execution details.

Accordingly, embodiments are described herein for automated runtime configuration for dataflows. Such embodiments automatically may select or adapt a runtime environment or resources to a dataflow plan prior to execution, while eliminating guesswork and avoiding runtime failures and runtime scaling. Such embodiments may be configured in various ways.

Figure 1:
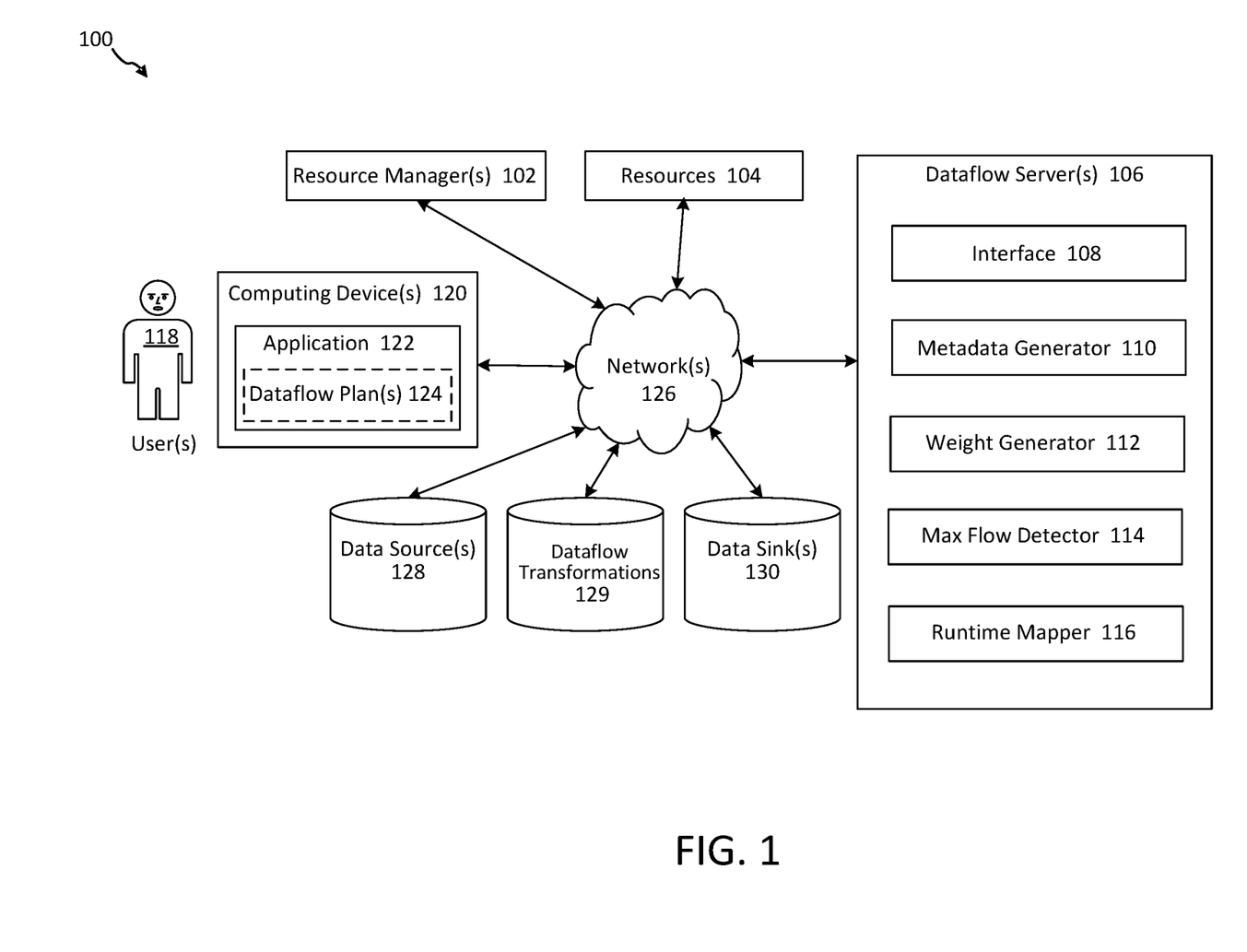
FIG. 1 is a block diagram of a system for automated runtime configuration for dataflows, according to an example embodiment.

For instance, FIG. 1 is a block diagram of an automated runtime configuration selection system 100 for dataflows, according to an example embodiment. System 100 presents one of many possible example implementations. System 100 may comprise any number of computing devices and/or servers, such as the example components illustrated in FIG. 1 and additional or alternative devices not expressly illustrated. Other types of computing environments involving automated runtime configuration for dataflows are also contemplated.

As shown in FIG. 1, example system 100 includes one or more resource manager(s) 102, resources 104, one or more dataflow server(s) 106, one or more computing device(s) 120, one or more data source(s) 128, one or more dataflow transformations 129, and one or more data sink(s) 130, which may be communicatively coupled together by one or more network(s) 126. Any combination of computing device(s) 120, resources 104, dataflow server(s) 106, data source(s) 128, data transformations 129, and/or data sink(s) 130 may be part of an organization (e.g., a business enterprise), part of a cloud-based third party entity, or form any other type of single- or multiple-entity configuration.

Network(s) 126 may include one or more of any of a local area network (LAN), a wide area network (WAN), a personal area network (PAN), a combination of communication networks, such as the Internet, and/or a virtual network. In example implementations, any one or more of resource manager(s) 102, resources 104, dataflow server(s) 106, computing device(s) 120, data source(s) 128, dataflow transformation 129 and data sink(s) 130 may communicate over networks(s) 126 via one or more application programming interfaces (APIs), and/or according to other interfaces and/or techniques. Resource manager(s) 102, resources 104, dataflow server(s) 106, computing device(s) 120, data source(s) 128, dataflow transformation 129 and data sink(s) 130 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Computing device(s) 120 may represent any number of computing devices, each of which may comprise any computing device utilized by one or more users. Computing device(s) 120 may comprise one or more applications, operating systems, virtual machines, storage devices, etc., that may be executed, hosted, and/or stored therein or by one or more other computing devices on or over network(s) 126. In an example, computing device(s) 120 may access one or more server devices, resources and/or storage devices related to data transformations, such as, resources 104, dataflow server(s) 106, data source(s) 128, dataflow transformation 129 and/or data sink(s) 130. Computing device(s) 120 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device(s) 120 are not limited to physical machines, but may include other types of machines or nodes, such as a virtual machine. Computing device(s) 120 may each interface with dataflow server(s) 106 through APIs and/or by other mechanisms. Any number of program interfaces may coexist on computing device(s) 120.

User(s) 118 includes one or more of any suitable type of user (e.g., individual users, family users, enterprise users, governmental users, etc.) at any number of locations. User(s) 118 may, for example, have a role within an enterprise (e.g., data engineer or another role). User(s) 118 may interact with dataflow server(s) 106 (e.g., via application 122, computing device(s) 120 and network(s) 126) to develop and execute dataflow plans. User(s) 118 may interact with application 122 displayed by computing device(s) 120, for example, to provide input (e.g., dataflows, preferences), receive results, cause system 100 to perform functions (e.g., analyze and provide feedback for dataflows, execute dataflows, provide results, and/or request input). User preferences may include indications of, for example, whether execution is time-sensitive and/or cost sensitive. Preferences may become independent dataflow plan features and/or may influence metadata and/or weighting of other dataflow plan features.

Application 122 may comprise a dataflow design tool or other suitable tool/application implementable on one or more computing devices. Application 122 may be configured and used to create codeless (e.g., graphical) dataflows to process data. Application 122 may comprise, for example, a Web application provided by dataflow server(s) 106 or a locally executed application that interacts with dataflow server(s) 106 (e.g., through an application programming interface (API) or agent). User(s) 118 may use application 122 to create, edit, review and/or transform data stored on data source(s) 128 and data sink(s) 130. User(s) 118 may layout and configure data sources, data sinks, operations, etc. on a dataflow design canvas provided in a GUI (graphical user interface) displayed by computing device(s) 120. User(s) 118 may use application 122 to create and submit dataflow plans (e.g., dataflow plan(s) 124) to, and receive feedback and/or results from, dataflow server(s) 106.

Application 122 may provide a preview that user(s) 118 may select to receive a preliminary analysis to check for errors, receive an estimate of execution resources, time and/or cost, evaluate proposed changes (e.g., relative to errors, execution time and/or cost), and so on prior to submitting a dataflow plan for execution. A user may receive feedback while creating a dataflow, such as suggesting a left-join rather than a cross join to reduce workload. Feedback and user preferences may allow users to edit and re-save dataflows with one or more improvements and/or preferences prior to submission to dataflow server(s) 106.

In an example, Application 122 may provide a dataflow canvas in a graphical user interface displayed by computing device(s) 120. A user may use application 122 (e.g., Microsoft® Azure Data Factory) to visually design data transformations in a logical flow (e.g., a graph with nodes and connecting edges) on the dataflow canvas without writing any code. Application 122 and/or dataflow server(s) 106 may realize mapping data flows created by user(s) 118 by providing translation of visual depictions to code, path optimization, execution planning (e.g., selecting an execution environment), scheduling and execution.

Dataflow plan(s) 124 may comprise one or more of any type of dataflow plan. In an example, a dataflow plan may comprise a codeless (e.g., graphical) specification indicating input data to be processed, how the input data is to be processed (e.g., applicable data transformations), and the data to be output. A dataflow (e.g., of dataflow(s) 124) may indicate, for example, one or more data sources (e.g., data source(s) 128), one or more dataflow transformations (e.g., dataflow transformations 129) and one or more data sinks (e.g., data sink(s) 130).

Resource manager(s) 102 manage resources 104. Resource manager(s) 102 may be implemented on one or more computing devices (e.g., servers) to manage one or more types of computing resources (e.g., resources 104). Managed computing resources (e.g., resources 104) may comprise, for example, computing resources in a data center as well as computing resources in other locations. Types of computing resources may comprise, for example, processors, virtual machines (VMs), memory, network, storage, and/or other computing resources. Dataflow server(s) 106 (e.g., a dataflow scheduler) may communicate with resource manager(s) 102, for example, to allocate and configure resources 104 to execute dataflow plans (e.g., dataflow plan(s) 124). Resource manager(s) 102 may allocate and configure one or more servers and/or other resources, for example, to execute one or more dataflow plans (e.g., dataflow plan(s) 124). In an example, resources allocated and configured to execute a dataflow plan may comprise a group of servers configured with an appropriate number of processor cores, amount of memory, amount of storage and network bandwidth.

Data source(s) 128, dataflow transformations 129, and data sink(s) 130 each store data. Data source(s) 128, dataflow transformations 129, and data sink(s) 130 (e.g., and storage resources that may be used for dataflow execution) may comprise any number and type of storage devices in any number of locations configured to store one or more types of data (e.g., information) in one or more formats. Data source(s) 128 may store data to be used as input to the execution of a dataflow plan. Data sink(s) 130 may store data to be generated by execution of a dataflow plan.

Dataflow transformations 129 may store data transform algorithms that transform input source data into intermediate transformed data and, ultimately, sink (e.g., output) data during execution of a dataflow plan. Data source(s) 128, dataflow transformations 129, and/or data sink(s) 130 may have configurable settings (e.g., for data formats). In an example, user(s) 118 may configure data source(s) 128, dataflow transformations 129, and/or data sink(s) 130, e.g., based on feature vectors that may be extracted from data and data transforms that may be applied to data during execution of a dataflow plan. Data source(s) 128, dataflow transformations 129, and data sink(s) 130 may comprise one or more databases that store structured data managed by a database engine. Objects of a database may comprise, for example, tables, records, indexes, schemas, metadata, etc.

Dataflow server(s) 106 may comprise any number of computing devices, servers, services, local processes, remote machines, web services, etc. for providing (e.g., managing) dataflow services to one or more users of computing devices (e.g., computing device(s) 120). Dataflow server(s) 106 may provide an adaptive system to automatically size execution environments and computing resources therein to transform data for a dataflow plan, thereby providing a proactive approach rather than a reactive approach such as runtime scaling. Proactive and adaptive automatic execution environment selection before runtime reduces runtime dependency on resources. Dataflow server(s) 106 may run continuously, periodically, as a background service or other implementation.

Dataflow server(s) 106 may utilize one or more ML models. For example, one or more ML models may be trained based on known (e.g., historical) dataflow plans, execution environments and performance profiles to select execution environments for dataflow plans (e.g., ETL workloads), which may avoid (e.g., prevent) bottlenecks during runtime, e.g., along with avoiding delays and/or failures caused by bottlenecks). Automated execution environment (e.g., integration runtime) selection for a mapped data flow provided by dataflow server(s) 106 may increase runtime efficiency, reliability and cost-effectiveness for data processing pipelines. This is a proactive approach to allocate adequate resources, e.g., compared to a reactive approach (e.g., runtime scaling) that attempts to make adjustments during runtime for inadequacies detected in an execution environment. Execution environments and integration runtimes (IRs) may be referenced interchangeably.

Interface 108 provides an interface between computing device(s) 120 (e.g., application 122 executed thereon) and dataflow server(s) 106. Interface 108 may comprise, for example, an API. Interface 108 provides a front end for dataflow services. Interface 108 may provide input and output for dataflow services. Interface 108 receives incoming dataflow plans (e.g., dataflow plan(s) 124). Interface 108 may provide information and/or other feedback for display in a graphical user interface (GUI) provided by an operating system or application 122 executed by computing device(s) 120.

Metadata generator 110 generates metadata for dataflows, for example, in preparation for weight generator 112. Metadata may identify any aspect of importance to weight generator 112. Metadata generator 110 may generate metadata, for example, at publish time (e.g., when a dataflow is published, before compiling and execution). Metadata may comprise, for example, a total number and type of each source, transformation and sink, type(s) of data, size(s) of data being consumed, processed and written, a number of different write operations (e.g., insert, update, delete, etc.)

and so on. Metadata may be associated with a dataflow plan generally, by node, in a separate file, by association expected by weight generator 112, and/or in other manners.

Weight generator 112 generates weights for each node (e.g., operator, transform, or step) in a dataflow plan. Weight generator 112 may generate weights, for example, based on metadata and/or other indicators of a dataflow plan. Weights generated for an unweighted dataflow may indicate, for example, varying levels of consumption of one or more resources. Weight values may be normalized, for example, on a scale of 0 to 1. Weighting dataflow plans to determine resource configurations (e.g., in advance of execution) may be applied, for example, to any type of data processing pipeline.

Weight generator 112 may also provide weight adjustment or may add separate weights based on one or more user-specified preferences. In an example, application 122 may be configured to provide feedback, request and/or receive user preferences. Feedback may indicate (e.g., for a dataflow plan) estimated resources, run times and costs to let users choose between multiple IR configurations based on time sensitivity, cost sensitivity, or other preferences. For example, a GUI may display a dial or input box where a user may indicate a preference that can be fed into their model to determine whether to err on side of improved performance with more cost or more time and/or fewer resources with less cost.

Weight generator 112 may, for example, utilize a machine learning (ML) model to generate weights. A weight generating ML model may be trained based on historical dataflow plan metadata or other dataflow plan indicators for historical dataflow plans with known execution environments and known performance. Historical metadata may be used to create dataset features for training, which may be divided into training and validation sets (e.g., for cross validation). A trained and validated model may be used to infer weights (e.g., weight vectors) for dataflow plan(s) 124 received from user(s) 118.

Weight generator 112 may featurize a selective dataflow (e.g., ETL) dataset in order to generate a weighted dataflow from an unweighted dataflow. Feature sets generated for training ML models and for received dataflow plan(s) 124 may be based on types of dataflows. An unlimited number of dataflows may have millions of different settings, not all of which may be pertinent or factored in to determining IRs. Feature tuning and/or filtering (e.g., as part of an ML model) may pare down features relevant to dataflow execution. For example, one or more features may indicate (e.g., to an ML model trained on historical dataflow features) that a majority of data from data sources may not be used in a dataflow plan. The number of nodes may vary in each dataflow. Feature extraction may extract features from wide variety of dataflow plans. Feature types and values may vary with plans.

Dataflow plan(s) 124 may be broken down into features in a feature set (e.g., following metadata association). In an example, labels for types of features may be, for example, F1=type of transformation, F2=number of joins, F3=type of write operations (e.g., insert, update, delete), F4=type of sources, F5=type of sink, and so on. Feature entries may be values V1, V2, V3, V4, V5, etc. that represent or list a quantity/count of a type of feature, e.g., F2 is number of (e.g., 2) joins.

After a feature set is generated for a dataflow plan, a classification model (e.g., supervised logic/algorithm, decision tree, neural network, ML model) that has been pre-configured (e.g., logically constructed or trained) may be used to classify the feature set into a weighted diagram. A model may be trained with similar feature sets extracted from a similar set of dataflows. Training sets may be manually created (e.g., tagged) with metadata, feature sets may be extracted, weight sets may be assigned for feature sets, and execution environments and performance results may be known.

In an example, a training set to train an ML model may comprise dataflow plan features paired with weight vector values associated with execution environments known to have performed well. Table 1 shows a simplified example of a model training set comprising multiple pairs of dataflow plan (DFP) feature sets and weight vectors. Feature values (e.g., based on plan metadata) may be paired with weight vector values to train a Weight Generator ML model to infer weight vectors for dataflow plan(s) 124.

TABLE 1

Example of an ML model training set

| DFP  | F1  | F2  | F3  | F4  | F5  | Weight Vector Result |
|------|-----|-----|-----|-----|-----|----------------------|
| DFP1 | V1  | V2  | V3  | V4  | V5  | 0.2, 0.3, 1.0, 0.1, 0.4 |
| DFP2 | ... | ... | ... | ... | ... | ... |
| DFP3 | ... | ... | ... | ... | ... | ... |
| ...  | ... | ... | ... | ... | ... | ... |

Multiple weight generator models may be present. In an example, a weight generator model may be selected based on metadata. Some features may be selected from a larger set of available features for a dataflow plan, for example, based on the importance of the feature(s) to a selected model. Feature selection may, for example, be based on term frequency-inverse document frequency (TF-IDF). A feature set may comprise zero or more TF-IDF entries.

A common feature may not indicate anything unique about a dataflow. In an example, a feature (Feature 1) that occurs 5,000 times in a first dataflow and 6,000 or 7,000 times in other dataflows is not unique to the dataflow. Common features may have unique links to other features, which may be identified as features. Feature extraction may determine links between parts of dataflow, for example, to determine where features emanate from (e.g., feature1 is associated with a first source, feature2 is associated with a transformation, feature3 is associated with a join). A weight generator model may generate an array of weights (e.g., in vector form (0, 0.8, 1, 2), for example, based on selected (e.g., unique) features. A (e.g., each) feature may correspond to one transformation in the dataflow. A unique feature may be selected for each transformation. Each block in the dataflow may be assigned a weight, resulting in a weighted graph created from an unweighted graph input by a user. In an example, the number of nodes in a dataflow may be the size (e.g., length) of a weight vector. In other example, weights may not be assigned per node.

TF-IDF may indicate what (if anything) is unique in a dataflow, for example, in addition to complex features of a dataflow, such as a number of joins. Not all dataflows with the same number of joins may be executed with the same IR, for example, based on unique features and/or other features detected by TF-IDF. In an example, dataflows with the same number of joins without a window may map to IR1 while those with a window may map to IR2.

Max flow detector (MFD) 114 is configured to determine a maximum flow (e.g., in terms of an amount of data in a network, in memory and or computation) for a received dataflow plan. For example, max flow detector 114 may apply a max-flow min-cut theorem to a weighted dataflow to determine the maximum flow. Furthermore, max flow detector 114 may be used to detect bottlenecks in a flow diagram. Max flow identification(s) may be utilized, for example, to avoid bottlenecks, e.g., by planning an execution environment in advance of execution that will avoid bottlenecks.

The highest weight(s) may not indicate the max flow in an MFD implementation. For example, there may be little effect from a maximum weight at the end of a dataflow process (e.g., writing to a database sink). Identifying bottlenecks in a process may be more important to identify max flow in some implementations.

Runtime mapper 116 may use a maximum flow determination to select (e.g., map to) an execution environment (e.g., an integration runtime (IR)), for example, from a pre-defined list or dictionary of execution environments. Each of multiple execution environments may be associated with or mapped to a range of max-flow values. Mapping to execution environments may be based on fine and/or coarse ranges. Table 2 shows an example mapping of max flow (MF) values to resource configurations (RCs) of resources.

TABLE 2

Example mapping of max flow values
to execution environments

| MF range | Resource Configuration |
|----------|------------------------|
| 0-0.2    | RC1                    |
| 0.2-0.5  | RC2                    |
| 0.5-0.7  | RC3                    |
| ...      | ...                    |

Table 2 shows an example mapping of MF range 0 to 0.2 to a first resource configuration, a mapping of MF range 0.2 to 0.5 to a second resource configuration, a mapping of MF range 0.5 to 0.7 to a third resource configuration, and so on. Of course, this is one of and endless number of examples mapping weight vectors and/or max flow values to resource configurations.

Runtime mapper 116 may select an execution environment (e.g., IR (integration runtime) or RC (resource configuration)) before runtime (e.g., at compile time) for various reasons, such as to avoid runtime bottlenecks, delays, failures, and/or reallocations that occur when users select inadequate resources. The determination of an IR environment at compile time reduces the need to run time dependencies on external systems, thereby increasing the efficiencies and reliability of ETL pipelines.

Runtime mapper 116 may identify or select a best fit execution environment for a dataflow plan based on similarities between dataflow plan features, weight vectors and/or max flow detection relative to and feature sets, weight vectors and max flow detections that an ML model was trained on.

Selection of an execution environment is one of many types of classifications using a weighted data pipeline in combination with a max-flow detector. A maximum flow may be utilized to select a combination of computing resources to process a weighted pipeline. In an example, a combination of computing resources (e.g., number of servers, processor cores, memory at specific locations), storage resources (storage unit capacities and locations), and network resources (e.g., network interfaces and locations) may be selected based on a maximum flow determination for a weighted pipeline. For example, a best fit execution environment may be 16 processor core workers for 2 hours rather than 8 core workers at 8 hours costing four times more.

Runtime mapper 116 may be implemented, for example, with a predefined mapping dictionary, an ML model and/or other decision logic based on max flow, weight vectors and/or other information about a received dataflow plan.

Execution environments, integration runtimes (IRs) and resource configurations (RCs) may be referenced interchangeably. IRs may be configured and/or adjusted, for example, to be one or more of the following: compute optimized, memory optimized, storage optimized, and/or network optimized.

An execution environment (e.g., IR or RC) may indicate, for example, a number and type of resources for computing, memory, network, and storage resources. An execution environment may comprise, for example, five machines (computing devices), of which three machines with 32 GB RAM, 512 GB SSD, 1 GB/s Internet throughput, and two machines with 16 GB RAM, 256 GB SSD and 500 MB/s Internet throughput.

In an example, a diagramed flow may need more network throughput when data source(s) and processing are far away from each other. For example, a dataflow running in Western Europe that needs data stored in Eastern Europe or North America may need more network resources and/or faster network resources. In examples, a compute and/or memory optimized IR (e.g., memory optimized IR with 32 cores) may be selected for low data (e.g., a few gigabytes (GBs)) and heavy computing (e.g., many cross joins).

IR resources may be requested at compile time and constructed just in time (JIT) from datacenter (DC) resources. In an example, a data analytics platform (e.g., Microsoft® Azure Databricks) may construct and configure resources (e.g., computing, VM, network, and storage resources) from a resource manager (e.g., Microsoft® Azure Resource Manager). In an example (e.g., for a memory optimized IR with 32 cores), a data analytics platform executing on one or more dataflow server(s) 106 may fetch all the resources (e.g., 5 VMs with 32 GB memory and 1 GB throughput network) for the IR through a resource manager (e.g., resource manager(s) 102).

Runtime mapper 116 may be limited (e.g., in IR selection), for example, by user (e.g., customer) related limitations. In an example, a service level agreement (SLA) may specify a minimum or a maximum number of workers per second. Auto-selection may increase or decrease one or more resources and/or select different IRs based on extraneous agreements, for example. Prevailing conditions or resource availability may also impact IR selections by runtime mapper 116.

In an example, max flow detector 114 and runtime mapper 116 may be implemented as a (e.g., second) ML model, which may accept as input, for example, a weight vector and/or other configured input to generate as an output a classification in support of IR selection for received dataflow plan(s) 124.

Additional information may be utilized (e.g., in training data sets and received dataflow plans), for example, by metadata generator 110, weight generator 112 and/or IR selection by runtime mapper 116. In an example, weights may be selected, at least in part, based on day, time of day, prevailing resource load, cost, etc.

Figure 2:
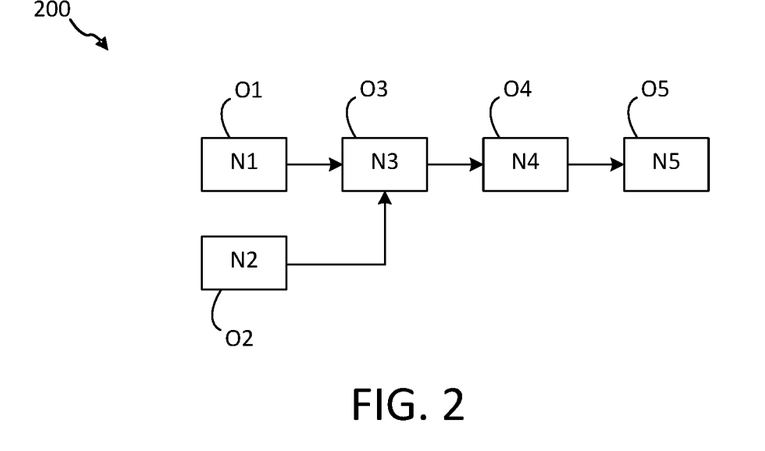
FIG. 2 is a block diagram showing an example dataflow plan, according to an embodiment.
Figure 3:
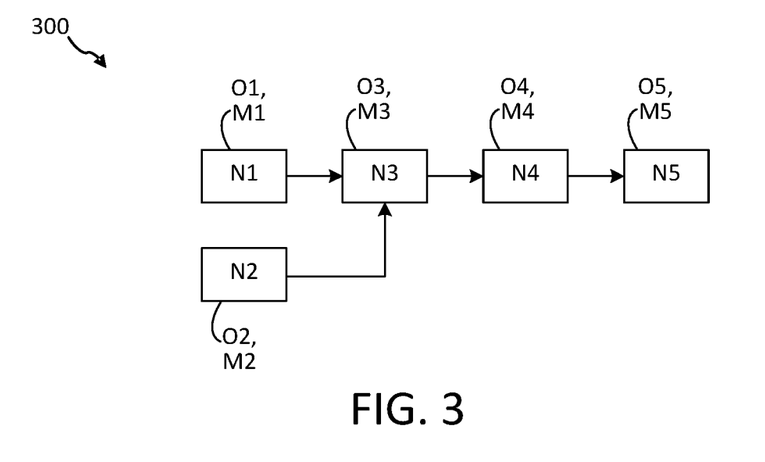
FIG. 3 is a block diagram showing example dataflow metadata associated with a dataflow, according to an embodiment.
Figure 4:
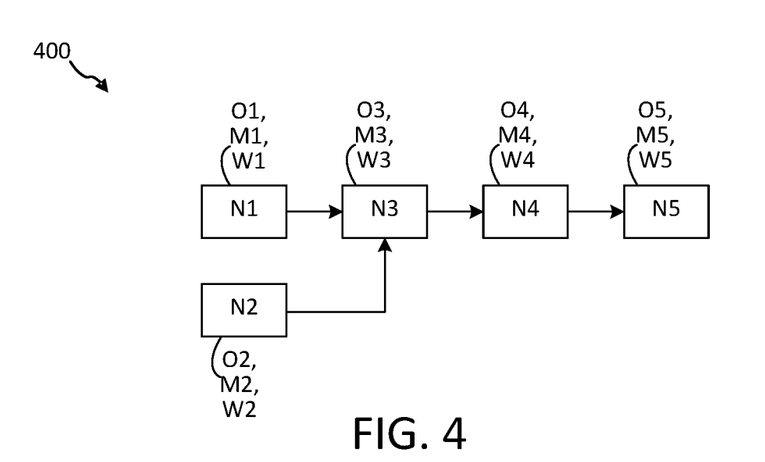
FIG. 4 is a block diagram showing an example of a weighted dataflow plan, according to an embodiment.

FIGS. 2-4 show examples of metadata and weights being generated, assigned and/or associated with nodes in a graph submitted as a dataflow plan. In other example implementations, metadata and/or weights may be assigned differently (e.g., based on edges, to a dataplan generally or as a whole, separately, such as in vectors). FIGS. 2-4 are, therefore, one of many different example implementations.

For instance, FIG. 2 shows block diagram showing an example unweighted dataflow plan 200, according to an example embodiment. Unweighted dataflow plan 200 may have been provided by user(s) 118 and received at interface 108, for example. Unweighted dataflow plan 200 may comprise a graph with nodes and connecting edges between nodes. For example, in FIG. 2, unweighted dataflow plan 200 includes first through fifth nodes N1-N5 that represent first through fifth data operations O1-O5. First and second operations O1 and O2 may represent data extraction operations from two data sources. Fifth operation O5 may represent a data writing operation of resulting data to a data sink (e.g., destination). In an example, a data source may comprise any type of storage, such as, a structured query language (SQL) database (DB) or data warehouse (DW), blob storage, cloud storage, etc.

FIG. 3 is a block diagram of an unweighted data flow plan 300 with associated dataflow metadata, according to an example embodiment. In particular, unweighted dataflow plan 300 is unweighted dataflow plan 200 of FIG. 2 with associated metadata M1-M5. In an example, metadata generator 110 may receive unweighted dataflow plan (e.g., input graph) 200 of FIG. 2 via interface 108. Metadata generator 110 may generate and attach or associate metadata with input unweighted dataflow plan 200 based on the workflow specified by the input graph. Metadata generator 110 may associate metadata with nodes and/or with operations. For example, metadata may associate metadata M1-M5 with first through fifth nodes N1-N5 (first through fifth operations O1-O5). Metadata generator 110 may be configured to generate metadata relevant to weighting operations by weight generator 112. For example, metadata may be configured based, at least in part, on features that a weighting ML model was trained on.

Metadata generator 110 may, for example, determine the number of sources, each type of source, the type and number of operations (e.g., the number of join operations or joins). Joins may consume more resources and time, which may lead to a larger workload to produce a node. Metadata may distinguish types of joins, which may have different workloads. For example, a join may be a cross join, where every possible combination on every row from each source may be joined. Metadata generator 110 may be configured to provide metadata M1-M5 based on what weight generator 112 (e.g., one or more ML models) may expect (e.g., to extract useful features).

FIG. 4 is a block diagram showing an example of a weighted dataflow plan 400, according to an example embodiment. FIG. 4 shows weighted dataflow plan 400 with weights W1-W5 generated by weight generator 112. For instance, weight generator 112 may receive unweighted dataflow plan 300 of FIG. 3 with associated metadata, for example, after metadata generator 110 associates metadata with unweighted dataflow plan 200 of FIG. 2. Weight generator 112 may be trained to process metadata, for example, based on historical metadata for historical dataflow plans with historical execution environments and historical performance. Weight generator 112 may generate weights, for example, based on a decision tree, a neural network, a trained ML model or other logic implementation.

Weights may be associated with (e.g., assigned to) nodes (e.g., first through fifth nodes N1-N5). Weights may indicate how "heavy" (e.g., resource-consuming) operation(s) may be in order to generate a node, for example, in terms of operational resources, such as one or more of compute resources, network bandwidth, storage resources, etc. Join operations may consume more resources and time, which may lead to higher weights being associated with join operations (e.g., to indicate it will take, relatively, more time and resources to produce a node relative to other nodes).

Weights may be assigned based on the number of data sources, types of data sources, operations (e.g., join, cross-join), total number of transformations, size of each data item in operation (e.g., cross join on 1 MB or 1 GB of data).

In an example, weight generator 112 may assign the following weights to nodes N1-N5 of unweighted dataflow plan 300: W1=0.2, W2=0.3, W3=1, W4=0.1 and W5=0.4. A higher weight associated with third node N3 may indicate a chokepoint that may need more resources than other nodes to avoid delays or failures during execution.

Runtime mapper 116 may receive an indication of weighted dataflow plan 400, such as a weight vector. A max flow detector (e.g., max flow detector 114 of FIG. 1) may use a max flow min cut theorem to find the max flow and the min cut (e.g., bottleneck or chokepoint). In an example, a weight of 1 may indicate a bottleneck, which may be used, at least in part, to determine the number and/or size of resources and/or execution environment needed for input dataflow plan 200.

Runtime mapper 116 may utilize a predefined dictionary or mapping table that relates max flow values or ranges to execution environments (e.g., integration runtimes or IRs). Max flow values may be normalized, for example, between 0 and 1. In an example, a first IR may be selected for a max flow range of 0 to 0.5, a second IR may be selected for a max flow range of 0.5 to 0.8 and a third IR may be selected for a max flow range of 0.8 to 1.

Implementations are not limited to the example shown in FIG. 1. Any number of computing devices and/or servers (including but not limited to machines and/or virtual machines) may be coupled in any manner via any type of computing environment. For example, one or more of computing device, server or storage components may be co-located, located remote from each other, combined or integrated on or distributed across one or more real or virtual machines. Example system 100 or components therein may operate, for example, according to example methods presented in FIGS. 5 and 6.

Figure 5:
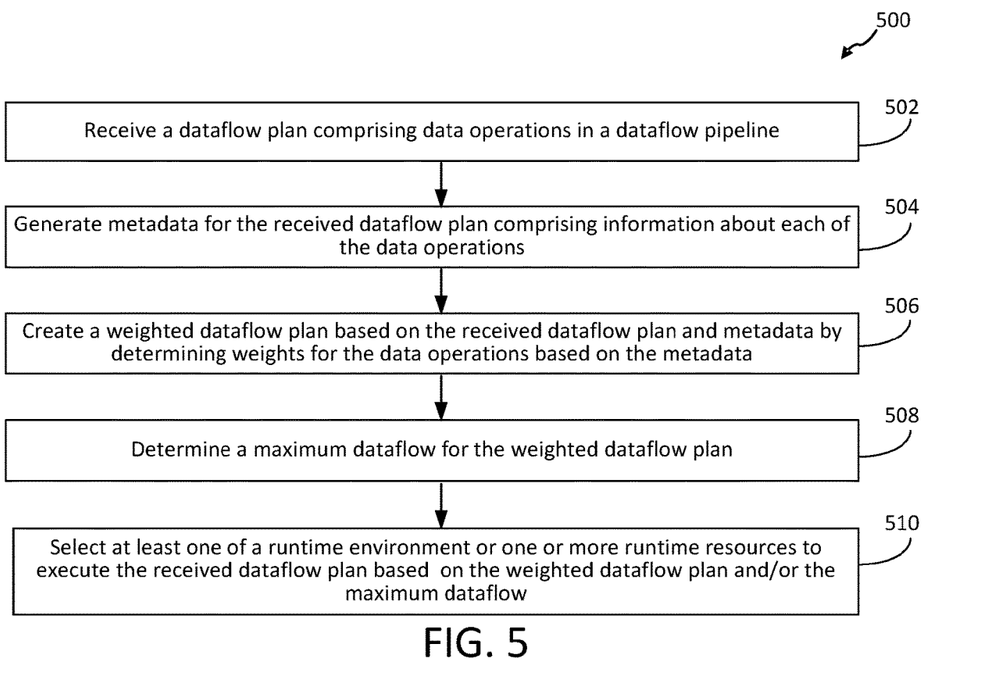
FIG. 5 is a flowchart showing an example method for automated runtime configuration for dataflows, according to an embodiment.

Embodiments may also be implemented in processes or methods. For example, FIG. 5 is a flowchart 500 showing an example method for automated runtime configuration for dataflows, according to an example embodiment. A dataflow plan may include user preferences (e.g., pre-weights), which may influence metadata and weight generation and/or IR selection. Preferences may be specified initially or upon feedback and/or input request. Embodiments disclosed herein and other embodiments may operate in accordance with example flowchart 500. Flowchart 500 comprises steps 502-510. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 2. FIG. 2 is simply one of many possible embodiments. Embodiments may implement fewer, more or different steps. Flowchart 500 is described as follows.

In step 502, a dataflow plan (e.g., comprising data operations in a dataflow pipeline) may be received. For example, as shown in FIGS. 1 and 2, dataflow server(s) 106 (e.g., interface 108) may receive dataflow plan(s) 124 via computing device(s) 120 and network(s) 126.

In step 504, metadata (e.g., comprising information about each of the data operations) may be generated for the received dataflow plan. For example, as shown in FIGS. 1 and 3, metadata generator 110 may generate metadata for dataflow plan(s) 124 received by interface 108.

In step 506, a weighted dataflow plan may be created (e.g., based on the received dataflow plan and metadata) by determining weights for the data operations based on the metadata. For example, as shown in FIGS. 1 and 4, weight generator 112 may generate a weighted dataflow plan 400 based on metadata annotated dataflow plan 300.

In step 508, a maximum dataflow may be determined for the weighted dataflow plan. For example, as shown in FIG. 1, max flow detector 114 may generate a max flow for weighted dataflow plan 400.

In step 510, at least one of a runtime environment or one or more runtime resources may be selected to execute the received dataflow plan based on the weighted dataflow plan and/or the maximum dataflow. For example, as shown in FIG. 1, runtime mapper 116 may select an execution environment (e.g., an IR or RC) for dataflow plan(s) 124 received by interface 108 based on weighted dataflow plan 400 and/or max flow determined by max flow detector 114.

Figure 6:
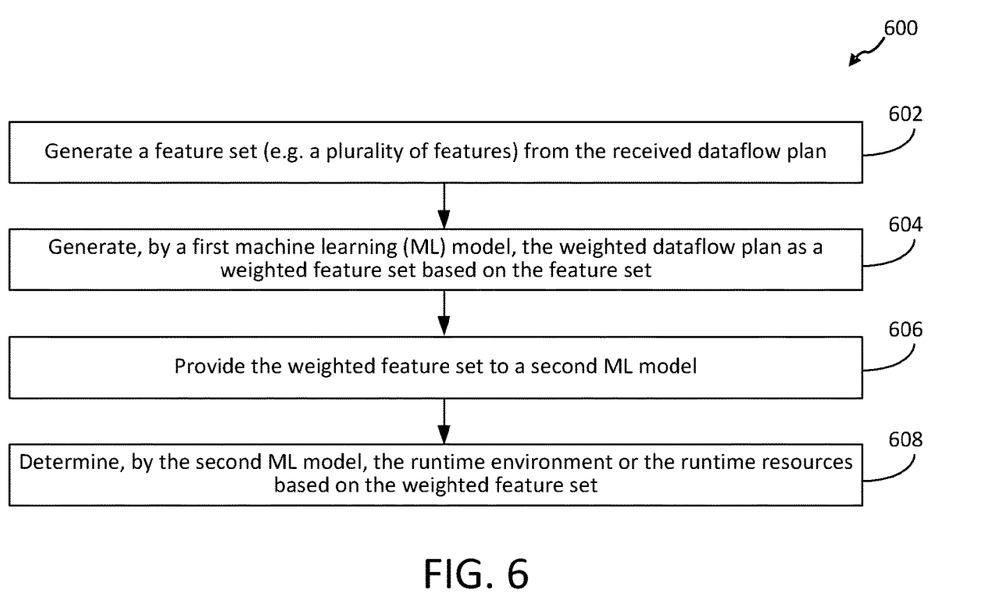
FIG. 6 is a flowchart showing an example method for automated runtime configuration for dataflows, according to an embodiment.

FIG. 6 is a flowchart 600 showing an example method for automated runtime configuration for dataflows, according to an example embodiment. FIG. 6 shows example detail for the example method shown in FIG. 5, for example, when utilizing ML models with feature sets to determine weights and runtime configurations for dataflow plans. Embodiments disclosed herein and other embodiments may operate in accordance with example flowchart 600. Flowchart 600 comprises steps 602-612. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 6. FIG. 6 is simply one of many possible embodiments. Embodiments may implement fewer, more or different steps. Flowchart 600 is described as follows.

In step 602, a feature set (e.g., a plurality of features) may be generated from the received dataflow plan. For example, as shown in FIG. 1, weight generator 112, implemented as a first trained ML model, may generate a feature set from dataflow plan(s) 124 received by interface 108 (e.g., and annotated with metadata by metadata generator 110).

In step 604, a first machine learning (ML) model may generate the weighted dataflow plan as a weighted feature set based on the feature set. For example, as shown in FIG. 1, weight generator 112, implemented as a first trained ML model, may generate a weighted dataflow plan as a weighted feature set based on the feature set extracted from dataflow plan(s) 124 received by interface 108 (e.g., and annotated with metadata by metadata generator 110).

In step 606, the weighted feature set may be provided to a second ML model. For example, as shown in FIG. 1, the weighted feature set generated by weight generator 112 may be provided to a second ML model comprising runtime mapper 116 (e.g., merged with max flow detector 114).

In step 608, the second ML model may determine the runtime environment or the runtime resources based on the weighted feature set. For example, as shown in FIG. 1, runtime mapper 116 implemented as a second ML model may receive as input a weighted feature set (e.g., as a vector) and output a classification of the weighted feature set as one or more IRs (e.g., with a confidence level associated with each IR classification).

III. Example Computing Device Embodiments

As noted herein, the embodiments described, along with any modules, components and/or subcomponents thereof (e.g., resource manager(s) 102, resources 104, dataflow server(s) 106, interface 108, metadata generator 110, weight generator 112, max flow detector 114, runtime mapper 116, computing device(s) 120, application 122, dataflow plan(s) 124, data source(s) 128, dataflow transformation 129, and/or data sink(s) 130), as well as the flowcharts/flow diagrams described herein (e.g., flowchart 500 and/or flowchart 600), including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 7:
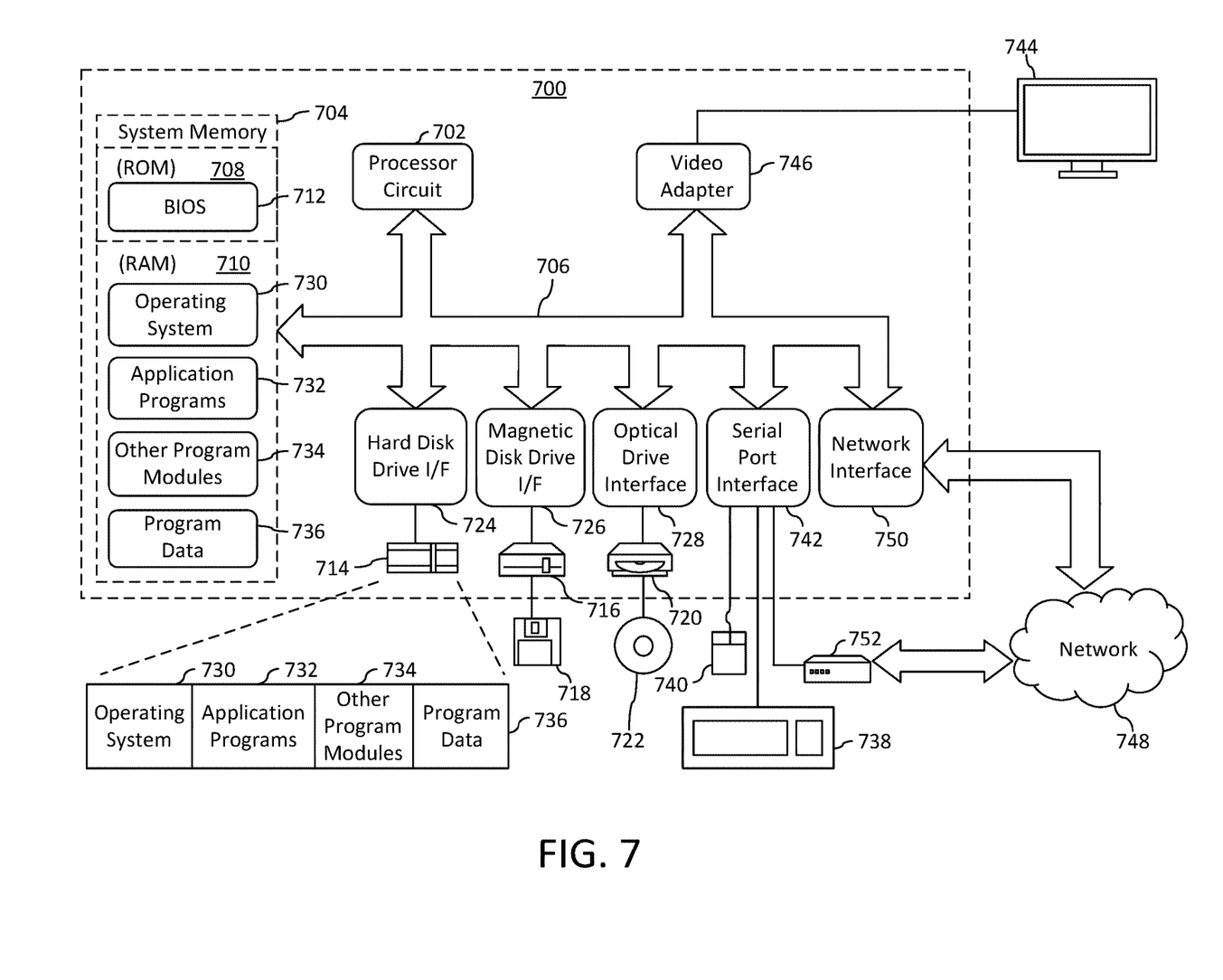
FIG. 7 is a block diagram of an example computing device that may be used to implement example embodiments.

FIG. 7 shows an exemplary implementation of a computing device 700 in which example embodiments may be implemented. For instance, one or more of computing device(s) 120, resource manager(s) 102, resources 104, data source(s) 128, dataflow transformations 129, data sink(s) 130, and/or dataflow server(s) 106 may include features of computing device 700. Consistent with all other descriptions provided herein, the description of computing device 700 is a non-limiting example for purposes of illustration. Example embodiments may be implemented in other types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing resource manager(s) 102, resources 104, dataflow server(s) 106, interface 108, metadata generator 110, weight generator 112, max flow detector 114, runtime mapper 116, computing device(s) 120, application 122, dataflow plan(s) 124, data source(s) 128, dataflow transformation 129 and data sink(s) 130, flowchart 500, and/or flowchart 600 (including any suitable step of flowcharts 500 or 600) and/or further example embodiments described herein.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of example embodiments described herein. Accordingly, such computer programs represent controllers of the computing device 700.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

Methods, systems and computer program products are provided for automated runtime configuration for dataflows, for example, to automatically select or adapt a runtime environment or resources to a dataflow plan (e.g., expressing data operations) prior to execution (e.g., to eliminate guesswork, avoid runtime failures and scaling). Data operations may comprise, for example, extracting input data from source(s), transforming input data into transformed data, and loading input data and/or transformed data into sink(s). Metadata may be generated for dataflows to indicate numbers and types of sources, sinks and operations, and the amount of data being consumed, processed and written. Weighted dataflow plans may be created from unweighted (e.g., codeless graphical) dataflow plans based on metadata. Weights that indicate operation complexity or resource consumption may be generated (e.g., by a trained model) and associated with data operations (e.g., features). A maximum flow may be determined from a weighted dataflow (e.g., using max flow min cut to identify bottlenecks). A runtime environment or resources to execute a dataflow plan may be selected based on the maximum flow. Runtime selections may be influenced by preferences (e.g., weights for cost or time sensitivity).

In an example, a system for automatic runtime environment or resource selection for a dataflow may comprise, for example, a metadata generator, a weight generator, a max flow detector and a mapper. A metadata generator may be configured, for example, to receive a dataflow plan comprising data operations in a dataflow pipeline; and generate metadata for the received dataflow plan comprising information about each of the data operations. A weight generator may be configured, for example, to create a weighted dataflow plan from the received dataflow plan by associating a weight with each of the data operations based on the metadata. A max flow detector may be configured, for example, to determine a maximum dataflow for the weighted dataflow plan. A mapper may be configured, for example, to select at least one of a runtime environment or one or more runtime resources to execute the received dataflow plan based at least on the maximum dataflow.

In an example, the weight generator may be configured to generate a feature set comprising a plurality of features from the received dataflow plan. The weight generator may be configured to create the weighted dataflow plan by generating a feature weight set for the feature set based on the metadata.

In an example, the max flow detector may be configured, for example, to determine the maximum dataflow based on application of a max-flow min-cut theorem to the weighted dataflow plan.

In an example, a method of automatic runtime environment or resource selection for a dataflow may comprise, for example, receiving a dataflow plan comprising data operations in a dataflow pipeline; creating a weighted dataflow plan from the received dataflow plan by associating a weight with each of the data operations; and selecting at least one of a runtime environment or one or more runtime resources to execute the received dataflow plan based at least on the weighted dataflow plan. This method may automatically and proactively, adapt or select a runtime environment or resources for a dataflow plan prior to execution, which may reduce or eliminate runtime guesswork, failures and/or scaling for dataflow execution of a dataflow plan.

In an example, a weight associated with a data operation may be selected from a weight range corresponding to an execution complexity range for each of the data operations in terms of consumption of at least one of computing, memory, storage and network resources.

In an example, a weight associated with a data operation may comprise a combined weight or a weight vector indicating at least two of computing, memory, storage and network resources.

In an example, the method may further comprise, for example, generating metadata for the received dataflow plan comprising information about each of the data operations. The weight associated with each of the data operations may be based on the metadata.

In an example, the method may further comprise, for example, determining a maximum dataflow for the weighted dataflow plan. The selection of the runtime environment or the runtime resources may be based on the maximum dataflow. In an example, a maximum dataflow may be defined, for example, in units of data sizes or a number of rows processed (e.g., based on type of data source(s)).

In an example, determining the maximum dataflow may comprise applying a max-flow min-cut theorem to the weighted dataflow plan.

In an example, the method may further comprise, for example, selecting the runtime environment or the runtime resources based on an indication of a preference related to at least one of execution time and execution cost to execute the received dataflow plan.

In an example, the method may further comprise, for example, providing feedback to a user interface indicating a plurality of runtime environments or a plurality of runtime resource alternatives and their costs in terms of at least one of time and price; and prompting user input to select from among the plurality of runtime environments or the plurality of runtime resource alternatives to execute the received dataflow plan.

In an example, the selection of the runtime environment or the runtime resources may comprise, for example, selecting between at least two of: compute optimized, memory optimized, network optimized, and storage optimized runtime environments or runtime resources.

In an example, the received dataflow plan may comprise a graph with nodes and edges provided by a user.

In an example, the method may further comprise, for example, restricting the selection of the runtime environment or the runtime resources based on one or more caps or limits specified in a user agreement.

In an example, the method may further comprise, for example, generating a feature set comprising a plurality of features from the received dataflow plan; and creating the weighted dataflow plan by providing the feature set as input a first machine learning (ML) model that generates a feature weight set.

In an example, the method may further comprise, for example, providing the feature weight set to a second ML model; and selecting the runtime environment or the runtime resources based on an output of the second ML model.

In an example, at least one feature in the plurality of features may be generated based on application of term frequency-inverse document frequency (TF-IDF) to the received dataflow plan.

In an example, a computer-readable storage medium may have program instructions recorded thereon that, when executed by a processing circuit, perform a method comprising: receiving a dataflow plan comprising data operations in a dataflow pipeline; generating metadata for the received dataflow plan comprising information about each of the data operations; creating a weighted dataflow plan from the received dataflow plan by associating a weight with each of the data operations based on the metadata; and selecting at least one of a runtime environment or one or more runtime resources to execute the received dataflow plan based at least on the weighted dataflow plan.

In an example, the method may further comprise, for example, determining a maximum dataflow for the weighted dataflow plan. The selection of the runtime environment or the runtime resources may be based on the maximum dataflow.

In an example, the weighted dataflow plan may be created based on the output of a first machine learning (ML) model. The runtime environment or the runtime resources may be selected based on the output of a second ML model.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
a processor; and
memory that stores program code executable by the processor to perform functions, the functions comprising:
receiving a dataflow plan comprising data operations in a dataflow pipeline;
providing feedback to a user interface indicating at least one of a plurality of runtime environments or a plurality of runtime resource alternatives and their costs in terms of at least one of time and price;
receiving a selection of user preferences from the user interface, related to the provided feedback, to execute the received dataflow plan;
creating a weighted dataflow plan from the received dataflow plan by associating a weight with each of the data operations based on the user preferences;
determining a maximum dataflow for the weighted dataflow plan; and
selecting at least one of a runtime environment or one or more runtime resources to execute the received dataflow plan based at least on the maximum dataflow.

2. The system of claim 1, the functions further comprising:
generating metadata for the received dataflow plan comprising information about each of the data operations.

3. The system of claim 1, wherein said determining the maximum dataflow for the weighted dataflow plan comprises applying a max-flow min-cut theorem to the weighted dataflow plan.

4. The system of claim 2, wherein the functions further comprise generating a feature set comprising a plurality of features from the received dataflow plan; and
wherein said creating the weighted dataflow plan comprises generating a feature weight set for the feature set based on the metadata.

5. A method, comprising:
receiving a dataflow plan comprising data operations in a dataflow pipeline;
providing feedback to a user interface indicating a plurality of runtime environments or a plurality of runtime resource alternatives and their costs in terms of at least one of time and price;
prompting user input to select from among the plurality of runtime environments or the plurality of runtime resource alternatives to execute the received dataflow plan;
creating a weighted dataflow plan from the received dataflow plan by associating a weight with each of the data operations; and
selecting at least one of a runtime environment or one or more runtime resources to execute the received dataflow plan based at least on the weighted dataflow plan.

6. The method of claim 5, wherein each weight associated with each of the data operations is selected from a weight range corresponding to an execution complexity range for each of the data operations in terms of consumption of at least one of computing, memory, storage and network resources.

7. The method of claim 6, wherein each weight associated with each of the data operations comprises a combined weight or a weight vector indicating at least two of computing, memory, storage and network resources.

8. The method of claim 5, further comprising:
generating metadata for the received dataflow plan comprising information about each of the data operations,
wherein the weight associated with each of the data operations is based on the metadata.

9. The method of claim 5, further comprising:
determining a maximum dataflow for the weighted dataflow plan,
wherein the selection of the runtime environment or the runtime resources is based on the maximum dataflow.

10. The method of claim 9, wherein determining the maximum dataflow comprises applying a max-flow min-cut theorem to the weighted dataflow plan.

11. The method of claim 5, further comprising:
selecting the runtime environment or the runtime resources based on an indication of a preference related to at least one of execution time and execution cost to execute the received dataflow plan.

12. The method of claim 5, wherein the selection of the runtime environment or the runtime resources comprises selecting between at least two of: compute optimized, memory optimized, network optimized, and storage optimized runtime environments or runtime resources.

13. The method of claim 5, wherein the received dataflow plan comprises a graph with nodes and edges provided by a user.

14. The method of claim 5, further comprising:
restricting the selection of the runtime environment or the runtime resources based on one or more caps or limits specified in a user agreement.

15. The method of claim 5, further comprising:
generating a feature set comprising a plurality of features from the received dataflow plan; and
generating, by a machine learning (ML) model, the weighted dataflow plan as a weighted feature set from the feature set.

16. The method of claim 15, further comprising:
providing the feature weight set to a second ML model; and
selecting the runtime environment or the runtime resources based on an output of the second ML model.

17. The method of claim 15, wherein at least one of the plurality of features is generated based on application of term frequency-inverse document frequency (TF-IDF) to the received dataflow plan.

18. A computer-readable storage medium having program instructions recorded thereon that, when executed by a processing circuit, perform a method comprising:
receiving a dataflow plan comprising data operations in a dataflow pipeline;
providing feedback to a user interface indicating a plurality of runtime environments or a plurality of runtime resource alternatives and their costs in terms of at least one of time and price;
prompting user input to select from among the plurality of runtime environments or the plurality of runtime resource alternatives to execute the received dataflow plan;
creating a weighted dataflow plan from the received dataflow plan by associating a weight with each of the data operations; and
selecting at least one of a runtime environment or one or more runtime resources to execute the received dataflow plan based at least on the weighted dataflow plan.

19. The computer-readable storage medium of claim 18, the method further comprising:
determining a maximum dataflow for the weighted dataflow plan, wherein the selection of the runtime environment or the runtime resources is based on the maximum dataflow.

20. The computer-readable storage medium of claim 19, wherein the weighted dataflow plan is created based on the output of a first machine learning (ML) model; or
wherein the runtime environment or the runtime resources are selected based on the output of a second ML model.

* * * * *